Sept. 13, 1938.   J. F. HARRISON ET AL   2,130,274
ROAD WORKING DEVICE
Filed Oct. 18, 1937   2 Sheets-Sheet 1
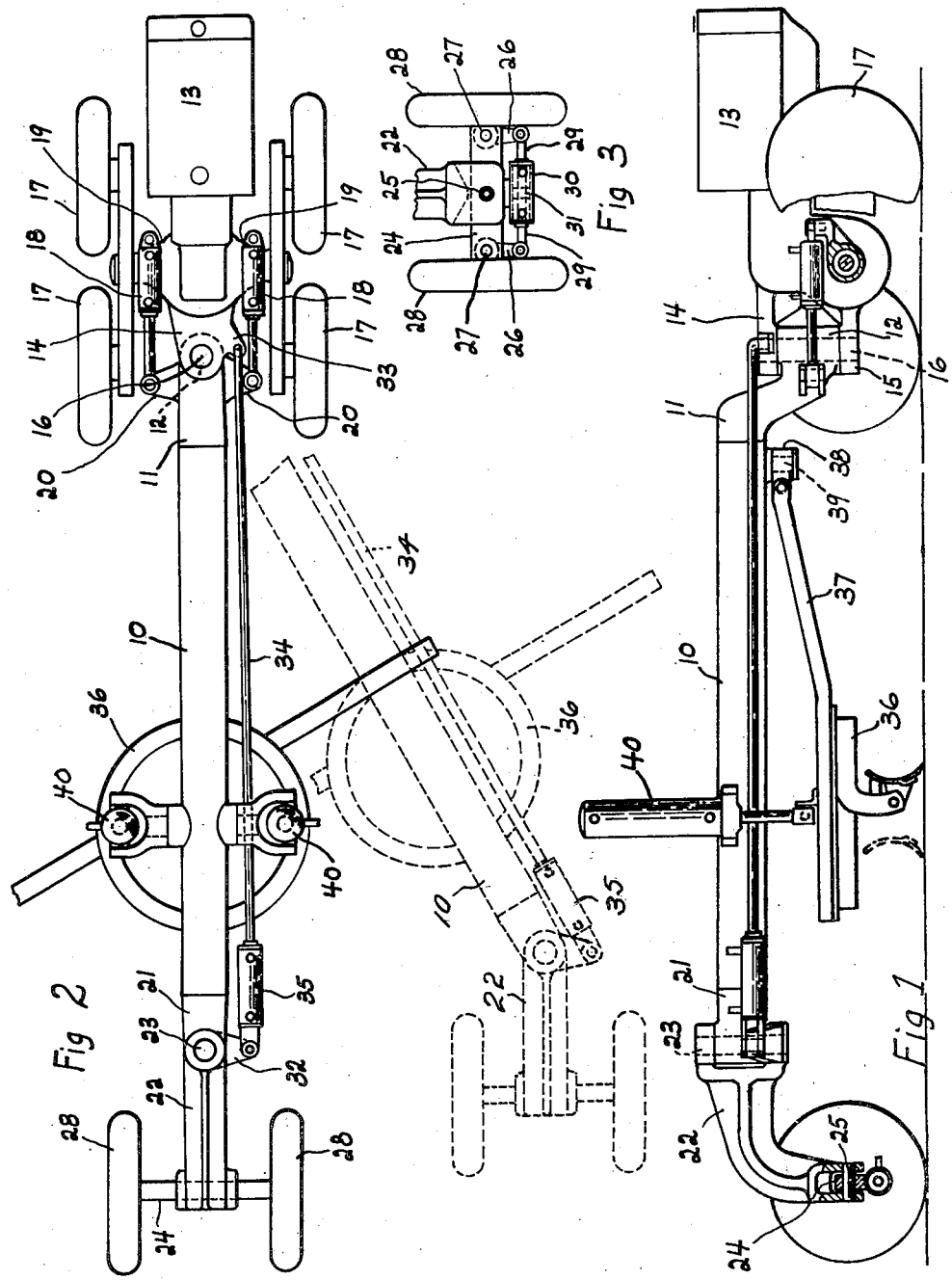
INVENTOR.
J. F. Harrison
H. B. Crum
BY Hull Brock + West
ATTORNEY.

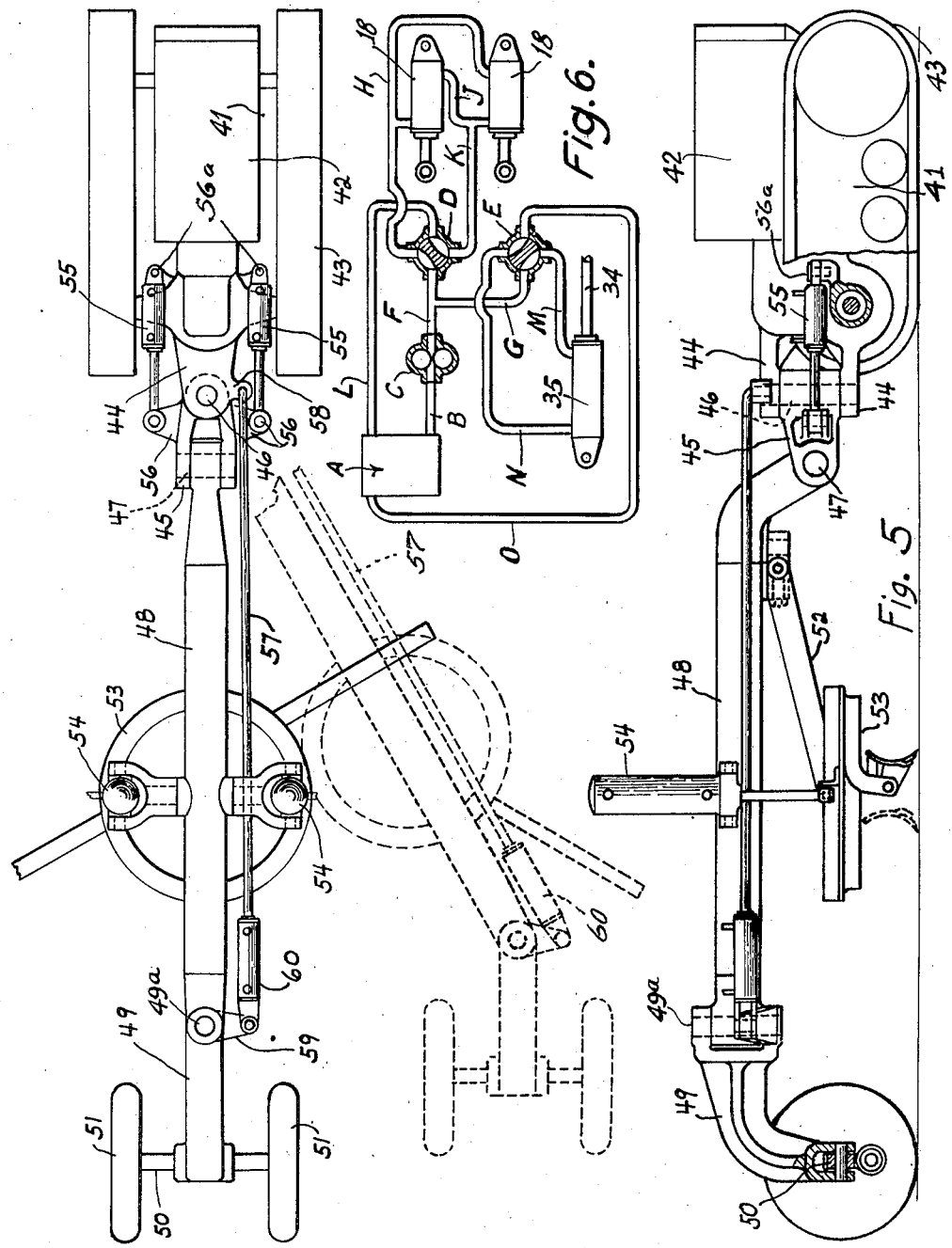

Patented Sept. 13, 1938

2,130,274

UNITED STATES PATENT OFFICE 2,130,274

ROAD WORKING DEVICE

John F. Harrison and Hollis B. Crum, Marion, Ohio

Application October 18, 1937, Serial No. 169,531

10 Claims. (Cl. 280—33.5)

This invention relates to road working machinery and has for its object to provide a simple and extremely flexible tool adapted for various types of road building and road maintenance work on various types of road contours.

More specifically stated, an object is to provide an elongated connecting element or frame having traction means pivoted thereto or otherwise articulated therewith at one end and a wheeled or equivalent supporting means pivoted thereto or otherwise articulated therewith at the other end together with means for controlling the angular relation of at least one of said means with respect to the frame and operative connections between the traction means and the support whereby the angular relation of the traction means or the supporting means to the frame will control the angular relation of the supporting means or the traction means respectively to the frame. A further object is to provide for varying the connection between the traction means and the support whereby the angularity between the support and the frame may be changed without changing the angular relation of the frame to the traction means.

The above and other and more limited objects are realized in and through the construction hereinafter described and illustrated in the accompanying drawings wherein Fig. 1 is a fragmentary side elevation of a power grader embodying the invention; Fig. 2 is a plan view of the structure shown in Fig. 1 indicating a different position of the parts in dotted lines; Fig. 3 is a fragmentary rear elevation of the support showing the relationship of the wheels and axles and control means therefor together with the connection of the axle to the caster element which is pivoted to the frame; Fig. 4 is a plan view of a modified form of the invention showing a more stable form of traction means and providing for both horizontal and vertical pivoting between the traction element and the frame; Fig. 5 is an elevational view of the form of Fig. 4; and Fig. 6 a diagrammatic view of the fluid pressure system whereby the supply of fluid to the hydraulic cylinders is controlled.

In the drawings (Figs. 1 to 3 inclusive) we have shown a main frame 10 taking the form of an elongated beam or pipe to the front end of which is rigidly secured an element 11 which extends downwardly and forwardly and terminates in a bearing 12. A tractor or traction means indicated generally by the numeral 13 is pivoted to the bearing 12 by means of elements 14 and 15 receiving a pin 16 which also extends through the bearing 12. The traction means 13 may be of any desirable type and is shown as consisting of a unitary power plant and drive to suitable wheels 17. The angular relation of the frame 10 and the tractor 13 is controlled by a pair of fluid pressure cylinders 18 connected to suitable brackets 19 on the traction and brackets 20 on the frame means.

The frame 10 is connected at one end to a fitting 21 which is pivoted to a caster element 22 by means of a pin 23. The caster element 22 extends downwardly and terminates in a bifurcated portion to which is pivoted the axle 24 by means of a central pin 25. The axle 24 carries suitable knuckles 26 which are pivoted to said axle as indicated at 27 and which carry suitable spindles (not shown) for rotatable mounting of the wheels 28. Connected to the knuckles 26 is a rod 29 which is received in a cylinder 30 and connected to a piston 31 working therein. By means of this construction the steering knuckles may be rotated about horizontal axes extending in the direction of motion of the device whereby to set the wheels 28 for different angles to resist side thrust.

Extending laterally from the caster element 22 is an arm 32. Extending laterally from the traction element 14 is a projection 33. A linkage including a rod 34 and a fluid pressure piston and cylinder assembly 35 connects the projections 32 and 33 whereby with a given setting of the cylinder 35 a change in the angular position of the traction means 13 with respect to the frame 10 will result in a change in the angular relation between the caster element 22 and the frame 10 and vice versa. With the link 34 set as shown, the traction element 13 and the support comprising the elements 22, 24 and 28 will be caused to move in parallel relation to each other. Thus the traction means may be run on a road with the support off the road and the whole proceed with the wheels in parallel relationship, as shown in broken lines in Fig. 2 the side thrust being overcome by a proper setting of the wheels 28. The pivoting action of the axle 24 about the point 25 will permit the device to be accommodated to irregular surfaces. In the event the device is to be driven around a corner or the general direction of motion altered in any way, the fluid pressure control element 35 may be operated to change the effective length of the linkage including the rod 34 so that the centers of the traction means and the support will both be displaced to the same side of the axis of the frame 10.

The manner in which the hydraulic pressure fluid may be controlled and supplied to the cylinders 18 and 35 will be described hereinafter in connection with the diagrammatic representation of said system which is shown in Fig. 6.

The earth working means indicated generally by the numeral 36 may be attached to the frame by means of suitable bars 37 pivoted to an element 38 for motion about a horizontal axis, the element 38 being in turn pivoted about a stud 39 for motion about a vertical axis. Any conventional controls 40 may be used for altering the position of the earth working means with respect to said frame vertically and laterally and for maintaining any set relation of said elements. It is to be understood that the fluid pressure elements 18, 30, 35 and 40 are to be controlled by the operator by means of suitable valves controlling a suitable source of fluid pressure and embodying means for preventing flow of liquid to or from such fluid pressure control elements except when desired. Likewise suitable controls for the tractor 13 are to be provided.

In the modified form of our invention shown in Figs. 4 and 5, we make use of a traction element 41 of the crawler type, that is, a traction element having a power plant 42 connected through suitable power transmission means to endless tracks 43. Carried by the traction element 41 are brackets 44 between which is pivoted an element 45 by means of a suitable vertical pin 46. Pivoted to the element 45 by means of a horizontally extending pin 47 is the frame 48. Pivoted to the other end of the frame 48 at 49ª is an element 49 to which is pivotally connected an axle 50 carrying wheels 51. Attached to the frame 48 for pivotal motion about both vertical and horizontal axes are straps 52 connected to an earth working element 53. Carried by the frame 48 are fluid pressure piston and cylinder assemblies 54 which control the earth working element 53. The angular position of the frame 48 with respect to the traction means 41 is controlled by fluid pressure means 55 connected to arms 56 on the element 45 and suitably pivoted to the traction element 41 as indicated at 56ª. A link rod 57 is pivoted at one end to a projection 58 on one of the brackets 44 and at the other end to an arm 59 on the element 49. The link rod 57 forms part of a linkage which includes a fluid pressure cylinder 60.

In Fig. 6 there is shown a diagrammatic view of the fluid pressure system whereby the supply of fluid to the hydraulic cylinders and the control of such supply are realized. For convenience of description, the system in this view is shown as connected to the cylinders contained in the embodiment of our invention illustrated in Figs. 1 and 2. However, it will be understood that the same system will be used in connection with the cylinders contained in the embodiment of our invention illustrated in Figs. 4 and 5.

In Fig. 6, A represents a sump which is connected by pipe B with a pressure pump C from which the pressure fluid is delivered to the casings of four-way valves D and E, through pipes F and G, respectively. From one of the ports of the valve D, the pipe H is arranged to deliver pressure fluid to one end of one of the cylinders 18 and to the opposite end of the other of said cylinders. When the parts are in the positions shown in the drawings, the fluid exhausted from these cylinders is delivered through pipes J and K to the other port in the valve D and thence through pipe L to the sump. By a suitable change in the position of the valve D in its casing, pressure fluid may be supplied to the opposite ends of the cylinders 18 and delivered therefrom to the sump through pipe H and valve D. By these operations, the frame and the wheel support may be placed on either side of the full line positions shown in Fig. 1, with the wheels of the said support and the wheels of the traction means in parallelism.

When it is desired to change the general direction of motion of the apparatus as a whole, this is accomplished by not only supplying fluid to the cylinders 18 in the manner described but also by supplying fluid to the cylinder 35. For the purpose of supplying and controlling the supply of fluid to the latter cylinder, the four-way valve E is provided. When the valve is in the position shown in the drawings, fluid passes from the pump through pipe G and pipe M to one end of the cylinder 35, thereby tending to shorten the effective length of the linkage connection between the arms 20 and 32, the fluid discharged from the opposite end of the cylinder being delivered through pipe N, valve E and pipe O to the sump. When it is desired to increase the effective length of the linkage between the arms 20 and 32, the position of valve E in its casing is changed so that the pressure fluid will enter the opposite end of the cylinder 35, being delivered thence to the sump through pipe L, valve E, and pipe N.

The operation of the form of device shown in Figs. 4 and 5 differs from that of the form shown in Figs. 1 to 3 in that the traction element 41 in the later form remains stable and the frame 48 pivots about a horizontal axis while in the earlier form the entire traction element could pivot about the drive shaft projecting from the differential housing. The remaining structure may be substantially identical in the two forms.

It is to be understood that in both forms the device may run in either direction, the earth working tool being reversible as indicated in Figs. 1 and 5 so that either or both of the devices may be operated in either direction according to the choice of the operator.

Wherever in the claims, rotation or pivoting about a vertical axis is specified, it is to be understood that such language includes structures (such as shown in Figs. 4 and 5) where rotation or pivoting about other axes or universally is possible.

While we have shown and described the present preferred embodiments of our invention, we do not wish to be limited to the details of the disclosure but only in accordance with the appended claims.

Having thus described our invention, what we claim is:

1. In a road working device, in combination, traction means, rolling support means, an elongated frame articulated at one end with said traction means and at the other end with said support means so as to be capable of angular movement with respect to both said means about substantially vertical axes, and operative connections between said traction means and said support means for automatically varying the angular relation of one of such means with respect to said frame responsive to a change in angular relation between said frame and the other of said means and in such direction as to maintain parallelism in the direction of movement of the traction means and the support means.

2. In a road working device, in combination, traction means, rolling support means, an elongated frame articulated at one end with said traction means and at the other end with said support means so as to be capable of angular movement with respect to both said means about substantially vertical axes, means for controlling the angular relationship between said frame and one of said means, and operative connections between said traction means and said support means for automatically varying the angular relation of one of such means with respect to said frame responsive to a change in angular relation between said frame and the other of said means and in such direction as to maintain parallelism in the direction of movement of the traction means and the support means.

3. In a road working device, in combination, traction means, rolling support means, an elongated frame articulated at one end with said traction means and at the other end with said support means so as to be capable of angular movement with respect to both said means about substantially vertical axes, and operative connections between said traction means and said support means for automatically varying the angular relation of one of such means with respect to said frame responsive to a change in angular relation between said frame and the other of said means, said operative connections including a link, said link being longitudinally extensible and contractible whereby the effective length of the same may be varied.

4. In a road working device, an elongated frame, traction means pivoted to one end of said frame for movement about a vertical axis, a wheeled support pivoted to the other end of said frame for movement about a vertical axis, and link means generally parallel to said frame and connected pivotally to said traction means and said wheeled support at points laterally spaced from the pivot connections of said traction means and wheeled support respectively to said frame.

5. In a road working device of the class described, an elongated frame, independently stable traction means pivoted to one end of said frame and capable of pivoting about a vertical axis, a wheeled support pivoted to the other end of said frame and capable of pivoting about a vertical axis, link means generally parallel to said frame and connected pivotally to said traction means and said wheeled support at points laterally spaced from the pivot connections of said traction means and wheeled support respectively to said frame, said link means including a cylinder and piston whereby its length may be controlled by fluid pressure means.

6. In a road working device, an elongated frame, traction means pivoted to one end of said frame for pivoting about vertical and horizontal axes, a wheeled support pivoted to the other end of said frame for pivoting about a vertical axis, link means generally parallel to said frame and connected pivotally to said traction means and said wheeled support at points laterally spaced from the pivot connections of said traction means and wheeled support respectively with said frame, and means for varying the effective length of said link means.

7. In a road working device, an elongated frame, traction means pivoted to one end of said frame and capable of pivoting about a vertical axis, a wheeled support pivoted to the other end of said frame and capable of pivoting about a vertical axis, link means generally parallel to said frame and connected pivotally to said traction means and said wheeled support at points laterally spaced from the pivot connections of said traction means and wheeled support respectively to said frame, said link means being longitudinally extensible and contractible whereby the effective length of the same may be varied.

8. In a road working device, an elongated frame, traction means pivoted to one end of said frame for movement about a vertical axis, a wheeled support pivoted to the other end of said frame for movement about a vertical axis, and link means generally parallel to said frame and connected pivotally to said traction means and said wheeled support at points laterally spaced from the pivot connections of said traction means and wheeled support respectively of said frame, said link means including means whereby the effective length of the said link means may be varied, and fluid pressure means for controlling the angular relation between said traction means and said frame.

9. In a road working device, an elongated frame, traction means pivoted to one end of said frame and capable of pivoting about a vertical axis, a wheeled support pivoted to the other end of said frame and capable of pivoting about a vertical axis, link means generally parallel to said frame and connected pivotally to said traction means and said wheeled support at points laterally spaced from the pivot connections of said traction means and wheeled support respectively to said frame, said link means including a cylinder and piston whereby its length may be controlled by fluid pressure means.

10. In a road working device, the combination of an elongated frame, traction means pivotally supported at one end of said frame for movement about a vertical axis, rolling support means pivotally connected at the opposite end of said frame for movement about a vertical axis, said pivotal connections being located substantially along the longitudinal axis of said frame, and operative connections between said traction means and said support means for automatically varying the angular relation of one of such means with respect to said frame responsive to a change in angular relation between said frame and the other of said means and in such direction as to maintain parallelism in the direction of movement of the traction means and the rolling support means.

JOHN F. HARRISON.
HOLLIS B. CRUM.